(12) United States Patent
Vergara (10) Patent No.: US 10,817,274 B2
(45) Date of Patent: Oct. 27, 2020

(54) TECHNIQUES FOR DISTRIBUTING SOFTWARE PACKAGES

(71) Applicant: salesforce.com, inc., San Francisco, CA (US)

(72) Inventor: Jeaneth A. Vergara, Granite Bay, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/885,282

(22) Filed: Jan. 31, 2018

(65) Prior Publication Data

US 2019/0235851 A1 Aug. 1, 2019

(51) Int. Cl.
- *G06F 8/65* (2018.01)
- *G06F 8/60* (2018.01)
- *G06F 21/64* (2013.01)
- *H04L 29/08* (2006.01)

(52) U.S. Cl.
CPC ............ *G06F 8/65* (2013.01); *G06F 8/60* (2013.01); *G06F 21/64* (2013.01); *H04L 67/1044* (2013.01); *H04L 67/1059* (2013.01); *H04L 67/34* (2013.01)

(58) Field of Classification Search
CPC ....................................... G06F 8/61; G06F 8/65
See application file for complete search history.

(56) References Cited

U.S. PATENT DOCUMENTS

| | | | |
|---|---|---|---|
| 7,035,310 B1 * | 4/2006 | Roberts | H04B 1/7143 375/132 |
| 9,842,031 B1 * | 12/2017 | Kharatishvili | G06F 11/1474 |
| 2002/0165962 A1 * | 11/2002 | Alvarez | H04L 41/22 709/226 |
| 2006/0031497 A1 * | 2/2006 | Beartusk | G06Q 10/10 709/225 |

(Continued)

OTHER PUBLICATIONS

The Basics of BitTorrent, Last Updated: Sep. 16, 2016, http://help.bittorrent.com/customer/en/portal/articles/178790-the-basics-of-bittorrent, 2 pages.

*Primary Examiner* — Wei Y Zhen
*Assistant Examiner* — Binh Luu
(74) *Attorney, Agent, or Firm* — Kowert, Hood, Munyon, Rankin & Goetzel, P.C.

(57) ABSTRACT

Techniques are disclosed relating to distributing software packages among servers in a data storage facility. In various embodiments, a package distribution computer system receives an indication that a software package is to be distributed to a plurality of server systems. In some embodiments, the computer system determines a division of the plurality of server systems into two or more groups for distributing the software package. In some embodiments, for a given group, the computer system selects a server system to retrieve the software package and facilitate peer-to-peer distribution of the software package to remaining server systems within the given group. In some embodiments, the computer system receives metadata specifying one or more files included in the software package. In some embodi- (Continued)

ments, the computer system provides the metadata to at least one of the remaining server systems in the given group for retrieving the software package from the selected server system.

14 Claims, 8 Drawing Sheets

(56) References Cited

U.S. PATENT DOCUMENTS

| | | | | |
|---|---|---|---|---|
| 2008/0263130 A1* | 10/2008 | Michalowitz | ....... | H04L 12/1859 709/202 |
| 2009/0106393 A1* | 4/2009 | Parr | .......... | H04L 63/0428 709/218 |
| 2009/0182815 A1* | 7/2009 | Czechowski, III | ... | H04L 67/104 709/206 |
| 2009/0259667 A1* | 10/2009 | Wang | .......... | H04L 45/125 711/118 |
| 2010/0011060 A1* | 1/2010 | Hilterbrand | .......... | G06F 8/65 709/204 |
| 2010/0250708 A1* | 9/2010 | Limberis | .......... | G06F 17/3002 709/219 |
| 2012/0297405 A1* | 11/2012 | Zhang | .......... | H04H 20/08 725/9 |
| 2014/0237465 A1* | 8/2014 | Lin | .......... | H04L 67/1063 717/173 |
| 2014/0304400 A1* | 10/2014 | Vergara | .......... | H04L 41/082 709/224 |
| 2014/0337393 A1* | 11/2014 | Burchall | .......... | G06F 16/2379 707/826 |
| 2016/0094456 A1* | 3/2016 | Jain | .......... | H04L 41/0813 370/235 |
| 2016/0335070 A1* | 11/2016 | Aw | .......... | G07C 9/00571 |
| 2017/0116335 A1* | 4/2017 | Baby | .......... | H04L 67/2814 |
| 2017/0345026 A1* | 11/2017 | Iannaccone | .......... | G06Q 30/0201 |
| 2017/0357496 A1* | 12/2017 | Smith | .......... | H04L 9/3228 |
| 2018/0375268 A1* | 12/2018 | Chapel | .......... | H05K 7/1492 |
| 2019/0081862 A1* | 3/2019 | Lockhart | .......... | H04L 41/0889 |

* cited by examiner

TECHNIQUES FOR DISTRIBUTING SOFTWARE PACKAGES

BACKGROUND

Technical Field

This disclosure relates generally to a data processing center, and more specifically, the distribution of software packages in that data processing center.

Description of the Related Art

Data processing centers generally include multiple server systems that are used to organize, process, store, and disseminate data. Accordingly, these server systems may each run a server application (e.g., a web server application) that allows them to carry out these functions. As developers work on the server application, they may wish to provide updates to the server systems in a data processing center. Accordingly, when an update is available, these server systems may all download the update from a central database. But issues arise, however, when these server systems all download concurrently. In particular, each server system may be connected to a core network switch that allows traffic to flow between them and the central database. When most of the server systems are downloading concurrently, this places a significant, undesirable strain on the core network switch and other network equipment (e.g., a load balancer) that participates in facilitating the transfer of the available update. Moreover, the transfer speed is vastly limited since network equipment such as the core network switch is limited at how fast it can receive, process, and forward data.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to execute an instance of a database management application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a database system having eight nodes, the terms "first" and "second" nodes can be used to refer to any two of the eight nodes.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes techniques for distributing software packages that overcome shortcomings of prior approaches. In various embodiments described below, a system (e.g., a data center) houses, among other things, various server systems running a server application. In such embodiments, when a software package (e.g., an update to the server application) is available for distribution to the server systems, a package distribution server system determines a division of the server systems into two or more groups. The package distribution server system, in some embodiments, selects a server system within each group to serve as a seed server system that retrieves the software package and facilitates peer-to-peer distribution of that software package to the remaining server systems in its group. In various embodiments, the package distribution server system receives metadata from each seed server systems that specifies the files included within the software package. In some embodiments, the package distribution server system sends the metadata to the respective remaining server systems in each group so that they can retrieve the software package from the seed server system in their group.

These techniques may be advantageous over prior approaches as these techniques allow for software packages to be distributed without placing a significant strain on core network switches and other network equipment such as load balancers. That is, in prior approaches, all server systems may undesirably concurrently retrieve the software package from a central database, which causes enormous traffic to flow through the core network switches that connect these systems to the central database. Even more, since the network core switches (and other network equipment) can only receive, process, and forward data a certain maximum rate, it can take an undesirable amount of time for all the server systems to retrieve the software package. The present disclosed techniques, in contrast, may allow for a subset of the server systems to retrieve the software package and distribute the package among their peer server systems. Accordingly, these techniques can reduce the strain placed on the core network switches (and the other network equipment) and can improve the speeds at which a software package can be distributed to server systems.

Figure 1:
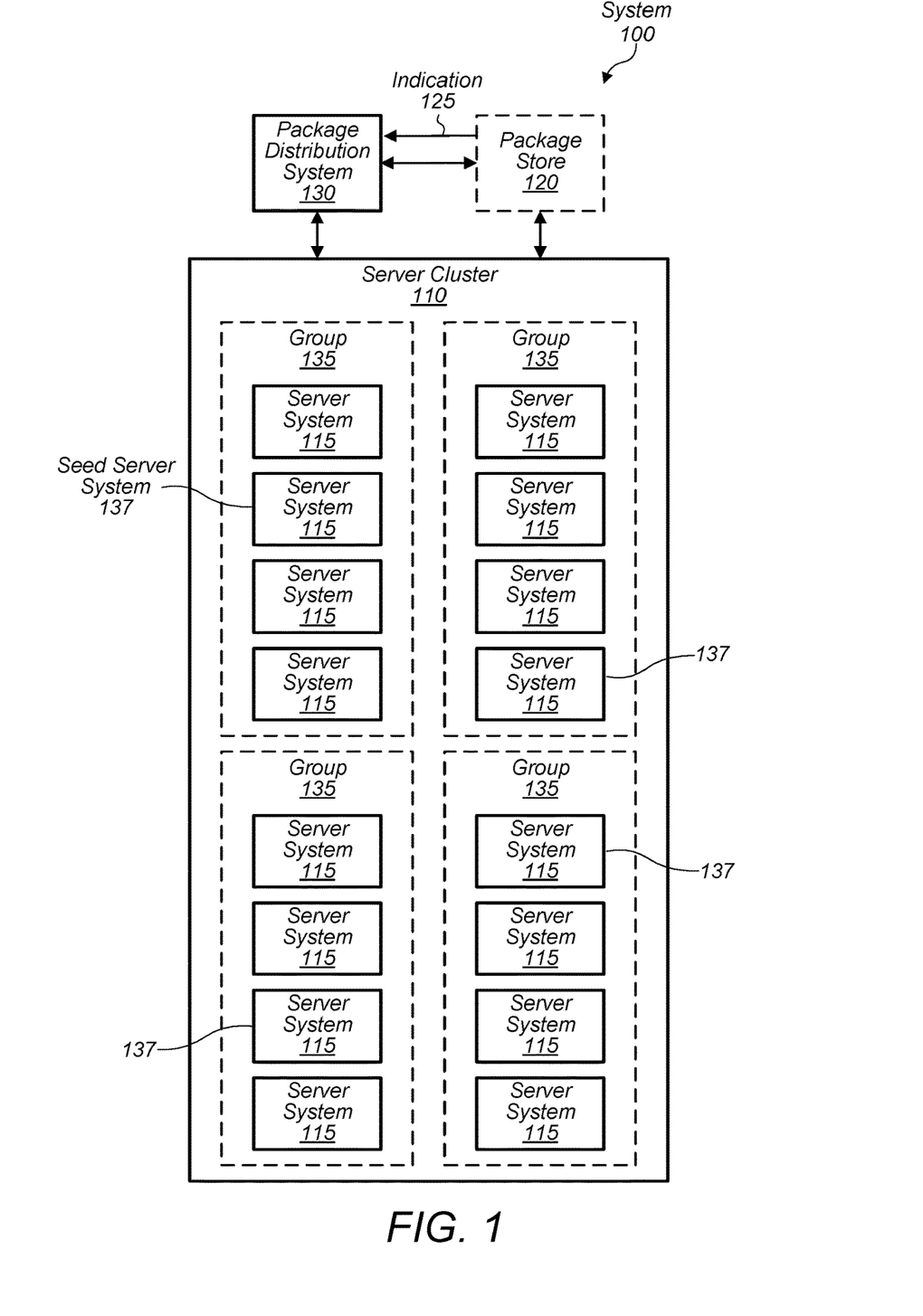
FIG. 1 is a block diagram illustrating example elements of a system that facilitates distributing a software package among server systems, according to some embodiments.

Turning now to FIG. 1 a block diagram of a system 100 is shown. In the illustrated embodiments, system 100 includes a server cluster 110, a package store 120, and a package distribution system 130. Also, as shown, server cluster 110 includes various server systems 115. While not depicted, system 100 may include multiple racks that house server systems 115 and a respective top-of-rack (TOR) network switch that connects systems 115 in that rack to core network switches. While shown within system 100, in some embodiments, package store 120 is located externally to system 100 and is accessible to multiple systems 100. In some embodiments, system 100 may be implemented differently than shown. For example, package distribution system 130 may be included in server cluster 110.

System 100, in various embodiments, is a combination of software routines and hardware that interacts with tenants, applications, and databases in order to store, analyze, and serve data. System 100 may execute software routines from various, different users as well as provide code, forms, tables, web pages, and other data to users, databases, and other entities associated with system 100. System 100 may be, for example, a subset of server systems in a data processing center (e.g., a server farm, data center, etc.), a data processing center, multiple data processing centers, etc. When system 100 encompasses multiple data processing centers, in various cases, the components within system 100 may be located in different data centers—e.g., server systems 115 may be located in one data processing center while package distribution system 130 is located in another.

Server cluster 110, in various embodiments, is a set of server systems 115 that are accessible to package distribution system 130 for distributing a software package. In some embodiments, server systems 115 are a combination of hardware and software routines that provides various services to other programs and systems. Accordingly, server systems 115 may run various programs including web applications, mail applications, file applications, printer applications, database applications, etc. In some embodiments, each server system 115 is connected to a Top-of-Rack (TOR) network switch through which it communicates with package store 120 and package distribution system 130—the traffic may flow through core network switches that sit between the TOR network switches and store 120 and system 130. In some embodiments, server systems 115 are each capable of downloading software packages from package store 120 and then installing them.

Package store 120, in various embodiments, is a repository (and the accompanying computer systems that handle that repository) for persistently storing and managing various types of data, including software packages. These software packages may include, but are not limited to, server applications, updates to server applications, and updates to underlying firmware of server systems 115. In various embodiments, each system 100 includes a store 120 that synchronizes with a central package store. Accordingly, in such embodiments, a user may promote a particular version of a server application at the central package store so that that version is distributed. In some embodiments, the applications that are managing the local package store 120 determine that a particular version has been promoted (via the latest manifest) and then begin downloading the particular version to store 120. In various embodiments, the applications that are managing store 120 notify distribution system 130 that a new software package is available for distribution; in other embodiments, distribution system 130 determines that a new software package is available by checking store 120—e.g., querying store 120.

Package distribution system 130, in various embodiments, is a set of software routines, hardware, or a combination thereof that facilitates the distribution of software packages from package store 120 to server system 115. In some embodiments, distribution system 130 is made aware of an available software package in response to receiving an indication 125 from package store 120 (or an end user). Indication 125 may specify the particular software package that is to be distributed among server system 115. In various embodiments, after a software package becomes available for distribution, distribution system 130 determines a division of server systems 115 into multiple groups 135. For example, in the illustrated embodiment, server systems 115 are divided into four different groups 135. Thereafter, in some embodiments, distribution system 130 selects a server system 115 from each group 135 to serve as a seed server system 137 that is responsible for downloading the software package from package store 120 and for distributing the software package to the remaining server systems 115 in that group 135. Methods for determining a division of systems 115 into groups 135 and for selecting seed server system 137 are discussed in greater detail below with respect to FIG. 2.

In some embodiments, distribution system 130 instructs the particular seed server system 137 for each group 135 to retrieve the software package from store 120 and to return metadata that describes the content of the retrieved software package. This metadata may include, but is not limited to, the names, sizes, and checksums of all files within the software package. In various embodiments, distribution system 130 instructs only one of the seeds 137 to return metadata (instead of all seeds 137). In some embodiments, after receiving metadata from seeds 137, distribution system 130 sends the metadata to the remaining server system 115 within each group 135—e.g., each remaining server system 115 may receive the metadata created by its corresponding seed server system 137. The metadata may allow systems 115 to know what files need to be requested from the seed server system 137 in their group 135. After sending out the metadata, distribution system 130 may then instruct the remaining server systems 115 to retrieve the software package from their seed server system 137.

By grouping server systems 115 into groups 135 and instructing one of them within each group 135 to retrieve a software package from package store 120, the traffic that flows through the core network switches to and from store 120 may be reduced. Moreover, the speed at which a software package can be distributed may be increased as the core network switches may no longer be the bottlenecks in the process. There may also be less layers of network equipment through which traffic must flow. Accordingly, a software package may be distributed to more server systems at a time in parallel than prior approaches. Example methods for determining a division of server systems 115 into groups 135 and for selecting seed server system 137 will now be discussed in greater detail with respect to FIG. 2.

Figure 2:
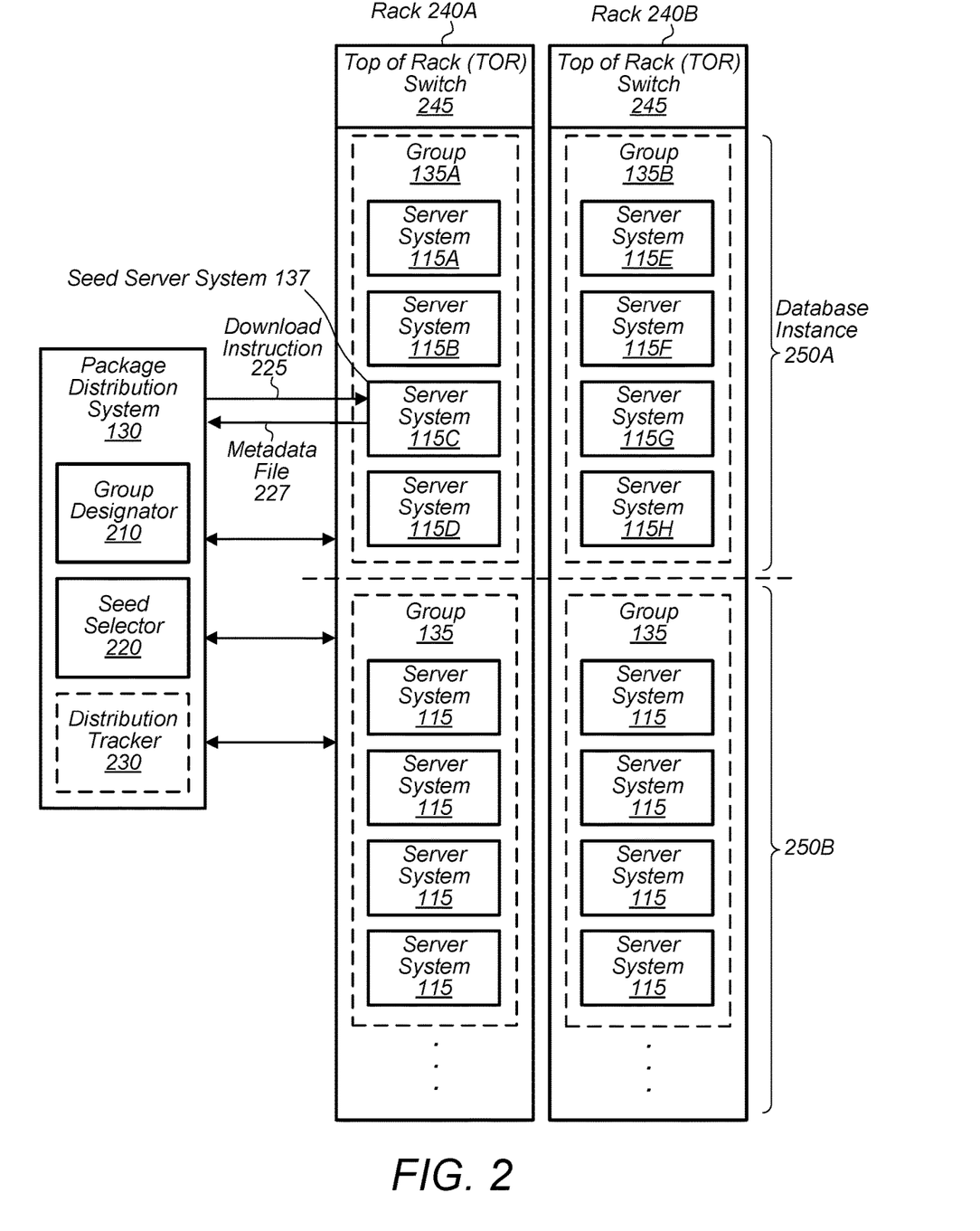
FIG. 2 is a block diagram illustrating example elements of a distribution system that determines a division of server systems into groups, according to some embodiments.
Figure 3:
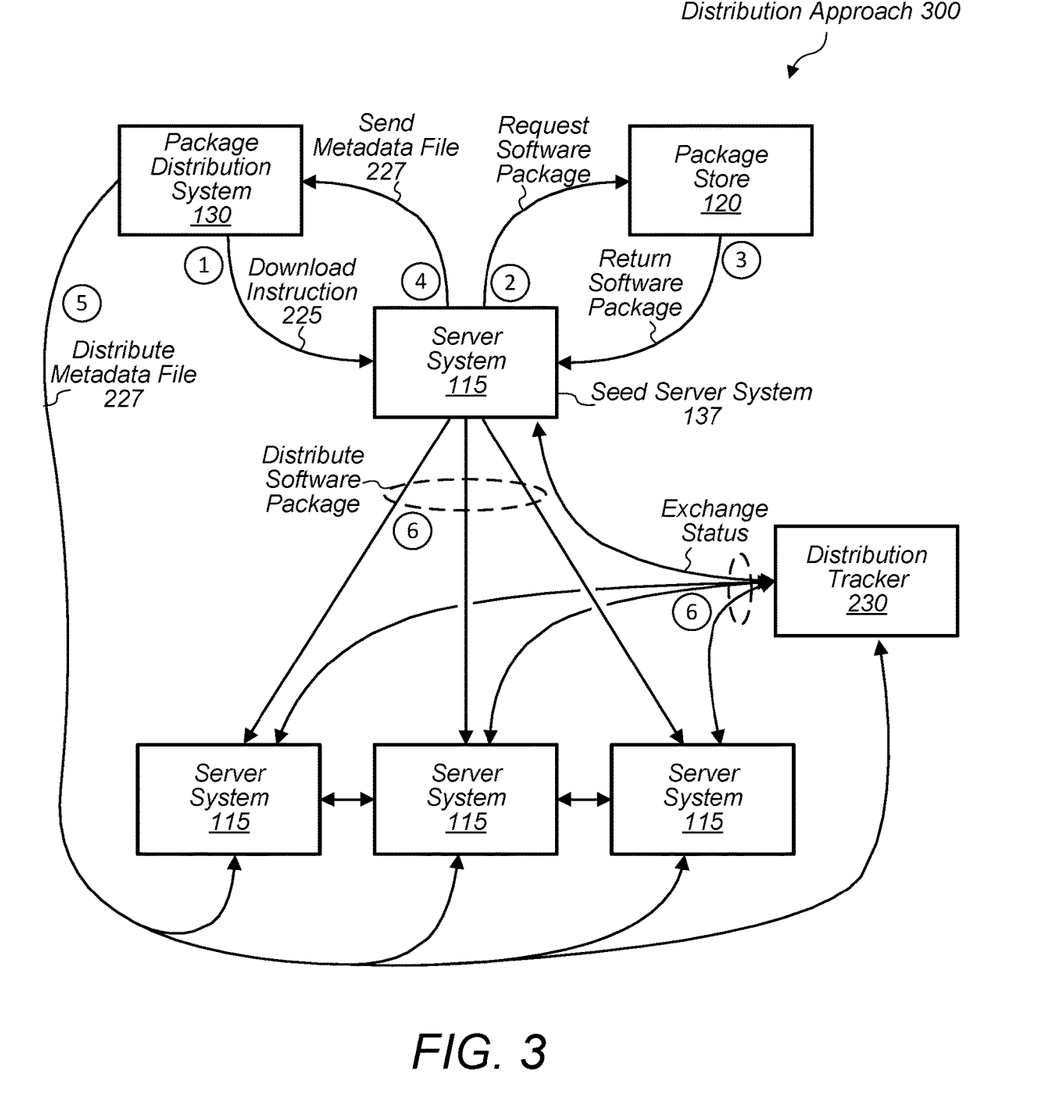
FIG. 3 is a block diagram illustrating example elements of a distribution approach for facilitating distribution of a software package, according to some embodiments.

Turning now to FIG. 2, a block diagram of a distribution system 130 is shown. In the illustrated embodiment, distribution system 130 includes a group designator 210, a seed selector 220, and a distribution tracker 230. The illustrated embodiment further depicts racks 240 that house server systems 115 and a respective top-of-rack (TOR) network switch 245. In some embodiments, distribution system 130 may be implemented differently than shown—e.g., tracker 230 may located externally to system 130 as depicted in FIG. 3.

As mentioned earlier, distribution system 130 may determine a (logical) division of server systems 115 into groups and then may select one server system 115 from each group to download the software package from store 120. By doing this, distribution system 130 may help reduce the strain placed on package store 120 and the core network switches (not shown) that connect server systems 115 to store 120. That is, instead of all server systems 115 downloading from store 120, only a subset may download from store 120. In various embodiments, system 130 performs these function by implementing group designator 210 and seed selector 220.

Group designator 210, in various embodiments, is a set of software routines that are executable to determine a division of server systems 115 into groups 135. Systems 115 may be divided into groups 135 based on various criteria, some of which are discussed in the present disclosure. Each criterion (discussed below) may be used as the sole criterion, or used in combination with some or all of the other criteria.

Server systems 115 may be placed into a group 135 based on the rack 240 in which they reside. In order to determine where a server system 115 resides, in some embodiments, designator 210 queries a server system 115 to determine its gateway Internet Protocol (IP) address. A server system 115's gateway IP address may correspond to the TOR network switch 245 (within its rack 240) to which it is connected. Accordingly, in grouping systems 115 by gateway IP address, designator 210 may group them by rack 240. Designator 210, in some embodiments, maintains (or has access to) a mapping of systems 115 to racks 240 (or TOR network switches 245) so that it does not have to query systems 115.

Server systems 115 may be placed into a group 135 based on the database instance 250 that they help implement. A database instance 250, in various embodiments, is a self-contained unit that includes all that is needed to run a service (e.g., a cloud platform), which may include an application server, a database server, a database, and a file system. In some cases, database instances 250 may be disseminated across multiple server systems 115 that are within different racks 240. As shown, for example, the upper four server systems 115 in each rack 240 are implementing database instance 250A while the next four systems 115 are implementing database instance 250B. In some embodiments, designator 210 maintains (or has access to) data that indicates which systems 115 are implementing a given database instance 250. Accordingly, designator 210 may use this data to group server systems 115 by database instance 250.

Server systems 115 may be placed into a group 135 based on the applications that they are running. For example, server systems 115 that are running a mail application may be placed in one group 135 while systems 115 that running a web application may be placed in a different group 135. This method of grouping may be considered more granular than grouping by database instance 250. In some embodiments, designator 210 maintains (or has access to) data that indicates which systems 115 are running a particular application so that it can group server systems 115 by application.

Designator 210, in some embodiments, determines a division of server systems 115 into groups 135 based on a combination of criteria. For example, server systems 115A-D may be placed into a group 135A since they reside within rack 240A and are implementing database instance 250A. Server systems 115E-H, however, may be placed into a different group (e.g., group 135B) since they reside within rack 240B instead of rack 240A. In some implementations, server systems 115 that are placed in one group (e.g., group 135A) do not download a software package from server systems 115 that are placed in another group (e.g., group 135B). After determining a division of systems 115 into groups 135, in various embodiments, designator 210 provides information about this division to other components of system 130, including seed selector 220.

Seed selector 220, in various embodiments, is a set of software routines that are executable to select a server system 115 within a group 135 to serve as a seed server system 137 for that group 135. As explained earlier, a seed server system 137 is responsible for retrieving a software package from package store 120 and for facilitating peer-to-peer distribution of that software package to the remaining server systems 115 within its group 135. Selector 220 may select a seed server system 137 based on various criteria, some of which are discussed in the present disclosure. Each criterion (discussed below) may be used as the sole criterion, or used in combination with some or all of the other criteria.

In some embodiments, seed selector 220 selects a seed server system 137 based on the impact that the role would have on a group 135 (or a database instance 250). In particular, seed selector 220 may select the server system 115 that would have the least impact if it failed or crashed while retrieving a software package and distributing it. For example, a system 115 running a printer application may be selected over a system 115 running a web application as the web application might have a more vital role in implementing a database instance 250. In some embodiments, seed selector 220 maintains (or has access to) data that indicates the importance of a given server system 115. (Note that the systems 115 that are down (e.g., for repair) may not be considered for a seed server system 137.)

In some embodiments, seed selector 220 selects a seed server system 137 based on a server system 115's available processing capacity. For example, a system 115 that is underutilized may be selected over a system 115 that is overutilized (e.g., is being significantly strained). In some embodiments, selector 220 may randomly select or pseudo-randomly select a seed server system 137 or may select the first system 115 listed for a group 135. As used herein, the term "pseudo-randomly select" refers to a selection that satisfies some threshold of randomness (e.g., satisfies one or more statistical tests for randomness), but may not be truly random.

After selecting a seed server system 137 for a group 135, in various embodiments, seed selector 220 issues a download instruction 225 to the selected server system 115. Instruction 225 may cause a server system 115 to retrieve a particular software package from store 120 and to generate a metadata file 227. Metadata file 227, in various embodiments, describes the contents of the retrieved software package (e.g., the names, sizes, and checksums of all the files in the software package). Metadata file 227 may further include the address of tracker 230 so that server systems 115 may communicate with tracker 230 in order to learn of seed server system 137. The seed server system 137 (e.g., server system 115C) may provide metadata file 227 to distribution system 130. Distribution system 130, in various embodiments, distributes a metadata file 227 (that is associated with a particular group 135) to distribution tracker 230 and to the remaining systems 115 (e.g., server systems 115A, 115B, and 115D) within the seed server system 137's group.

Distribution tracker 230, in various embodiments, is a set of software routines that are executable to coordinate the peer-to-peer dissemination of a software package among server systems 115 in a group 135. In order to coordinate this peer-to-peer dissemination, tracker 230 may keep track of which server system 115 is the seed server system 137 and which systems 115 are the peers/downloaders in a group 135. Additionally, in some embodiments, tracker 230 may keep track of which files in a software package have been downloaded by a given server system 115. Tracker 230, in some embodiments, initially determines which system 115 is the seed server system 137 (and thus has the software package) based on metadata file 227. (While metadata files 227 across multiple, different groups 135 may describe the same content for a software package, each metadata file 227 may be uniquely tied to a group 135.) When a server system 115 submits a request to tracker 230 for information about where to obtain a software package, tracker 230 may redirect that server system 115 to the seed server system 137 in its group 135 so that that server system 115 can download the software package. Thus, tracker 230 coordinate peer-to-peer dissemination of a software package. Tracker 230 is discussed in greater detail below with respect to FIG. 3.

After determining a division of server systems 115 into groups 135, selecting a seed server system 137 for each group 135, and instructing each seed server system 137 to download a software package and return a metadata file 227, distribution system 130 may then instruct the remaining server systems 115 to retrieve the software package from seed server system 137. An example approach for distributing the software package will now be discussed.

Turning now to FIG. 3, a block diagram of a distribution approach 300 is shown. In the illustrated embodiment, approach 300 involves package store 120, package distribution system 130, a group 135, and distribution tracker 230. Also, as shown, group 135 includes various server systems 115, one of which is a seed server system 137. The illustrated embodiment further depicts circled numbers that represent an example temporal ordering of approach 300—note that "Distribute Software Package" and "Exchange Status" are labeled with the same "6" as these may occur together. In some embodiments, approach 300 may be implemented differently than shown. Tracker 230, for example, may be included in distribution system 130 as depicted in FIG. 2.

Approach 300, in various embodiments, is a procedure for distributing a software package among server systems 115 in a group 135. Approach 300 may begin with package distribution system 130 issuing a download instruction 225 to the seed server system 137. Thereafter, in various embodiments, the seed server system 137 issues a request to store 120 for a software package and receives, in return, the software package. The seed server system 137 then, in some embodiments, creates a metadata file 227 describing the contents of the software package and sends the metadata file 227 to package distribution system 130. After receiving the metadata file 227, system 130 may then distribute the metadata file 227 to the remaining server systems 115 within group 135 and to distribution tracker 230. In addition to distributing the metadata file 227, distribution system 130 may also instruct the remaining server systems 115 to download and share the software package. In order to do so, the remaining server systems 115 may communicate with tracker 230 to learn of the seed server system 137.

Distribution tracker 230, in some embodiments, maintains information about which files in a software package reside on which server systems 115. This information may also specify which parts of a file have been downloaded by a server system 115 and which parts are being (or need to be) downloaded by that server system 115. As a server system 115 downloads a file, in various embodiments, it exchanges information with tracker 230. In particular, a server system 115 may provide information about which files that it has, which files that it is downloading (e.g., which parts have been download and which parts are being downloaded for a file), and which files that it needs to download. Accordingly, tracker 230 may track the progress of a server system 115 in downloading a software package from a seed server system 137. In exchange for the information from a system 115, tracker 230 may provide, to that system 115, information about which systems 115 that that system 115 can connect to in order to download a particular file in the software package.

Initially, a software package may be available from only the seed server system 137. Thus, when receiving a request from a server system 115 for that software package, tracker 230 may return information that indicates that the seed server system 137 has the software package. But as server systems 115 download files in the software package, tracker 230 may return information to a requesting server system 115 that indicates that the other server systems 115 have those files. In particular, a server system 115 may initially download files from the seed server system 137, but eventually, it may download the remaining files from other systems 115. Said differently, once a server system 115 has downloaded a file, it may then share that file with other server systems 115.

After downloading a file for a software package, in various embodiments, a server system 115 compares the checksum for that file against the checksum indicated in metadata file 227 to ensure that the file has been completely downloaded and has not been corrupted in any manner. Once a software package has been completely downloaded, a server system 115 may provide an indication to distribution system 130 that it has finished downloading the software package. This indication may also inform system 130 that the files included in the software package have been verified. Accordingly, once all available server systems 115 have downloaded and installed the software package, distribution system 130 may notify a user that the server systems 115 are ready to run the software package.

By using approach 300 in various embodiments, system 100 may reduce the traffic sent through the core network switches (not shown) and may also speed up the distribution of a software package. To further reduce the strain placed on the core network switches, a staggered approach may be implemented. An example of a staggered approach will now be discussed.

Figure 4:
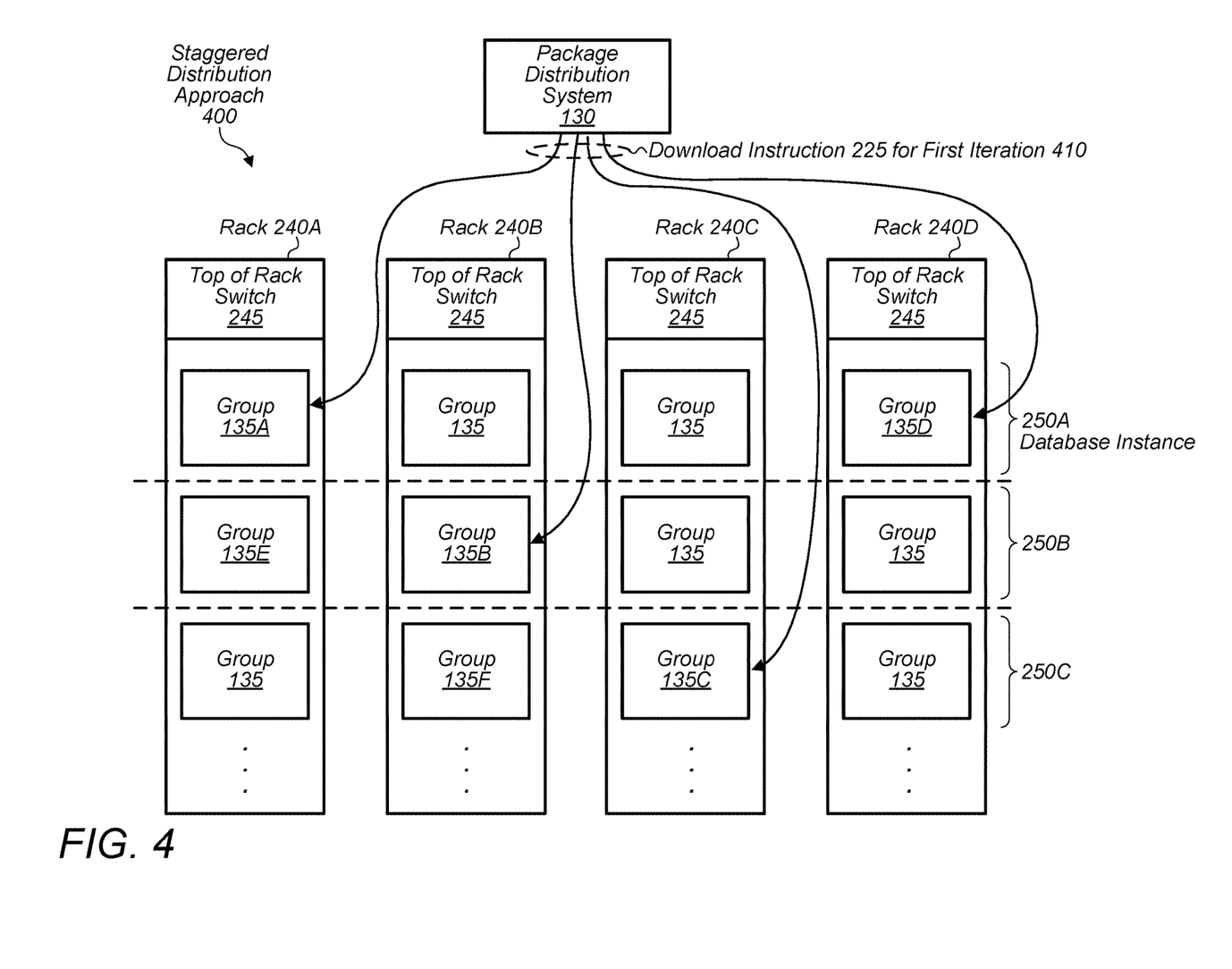
FIG. 4 is a block diagram illustrating example elements of a staggered distribution approach for facilitating a staggered distribution of a software package, according to some embodiments.

Turning now to FIG. 4, a block diagram of a staggered distribution approach 400 is shown. In the illustrated embodiment, approach 400 involves a package distribution system 130, multiple groups 135, multiple racks 240, and multiple database instances 250. While not shown, in various embodiments, approach 400 involves package store 120 and tracker 230.

Approach 400, in various embodiments, is a process for staggering the distribution of a software package by groups 135. That is, instead of having all seeds 137 concurrently download the software package from store 120, it may be desirable to have a subset of all seeds 137 download the software package. As such, distribution system 130 may select a subset of all seeds 137 based on various criteria, some of which are discussed in the present disclosure.

Distribution of a software package may be staggered by group 135 based on racks 240 (e.g., based on TOR network switches 245) and database instances 250. As explained earlier, a given database instance 250 may be implemented by server systems 115 residing in multiple racks 240. It may be desirable to ensure that a database instance 250 is not adversely affected by having most or all server systems 115 (that implement that instance 250) download a software package at the same time. Accordingly, in some embodiments, distribution system 130 may perform multiple iterations in which a different group 135 (e.g., a different database instance 250) in a given rack 240 is retrieving the software package from store 120 (e.g., the seed server system 137 is retrieving the software package). As shown, for example, in a first iteration 410, distribution system 130 issues a download instruction 225 to the first group (e.g., group 135A) in rack 240A, to the second group (e.g., group 135B) in rack 240B, and to the third group (e.g., group 135C) in rack 240C. Once distribution system 130 has rotated through all instances 250, in some embodiments, it starts over from the first database instance 250. Continuing with the previous example, distribution system 130 issues a download instruction 225 to the first group (e.g., group 135D) in rack 240D. In a second iteration (not shown), distribution system 130 may issue a download instruction 225 to the next group in a given rack—e.g., issue a download instruction to group 135E in rack 240A, to group 135F in rack 240B, etc.

Distribution of a software package may be staggered by rack 240. Accordingly, in some embodiments, distribution system 130 may issue download instruction 225 to all the groups 135 in a first rack 240 before issuing download instruction 225 to all the groups 135 in the next rack 240. For example, the seeds 137 in rack 240A may download the software package before the seeds 137 in rack 240B. In some embodiments, distribution system 130 may issue instruction 225 to all the groups 135 in a first rack (e.g., rack 240A) that acts as a test rack before issuing instruction 225 to all the groups 135 in the remaining racks (e.g., racks 240B, 240C, etc.). In some instances, distribution system 130 may issue instruction 225 in a pseudo-random manner to groups 135.

By staggering the distribution of a software package, distribution system 130 may further reduce the strain placed on package store 120 and the core network switches within system 100. Example methods for distributing a software package will now be discussed.

Figure 5:
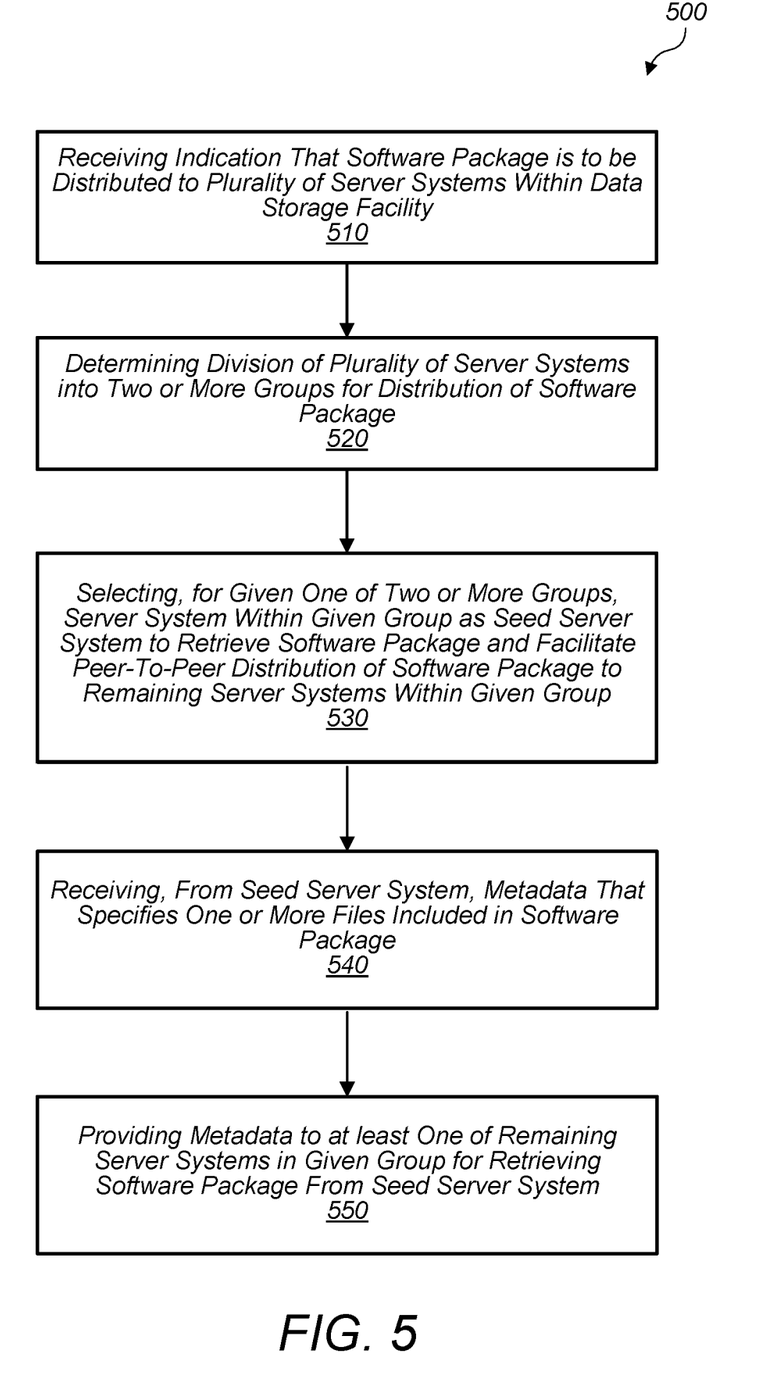
FIG. 5-7 is a block diagram illustrating example methods relating to distributing a software package, according to some embodiments.

Turning now to FIG. 5, a flow diagram of a method 500 is shown. Method 500 is one embodiment of a method performed by a computer system (e.g. package distribution system 130) to facilitate distribution of a software package. In some embodiments, method 500 may include additional steps such as notifying an end user that the software package has been distributed.

Method 500 begins in step 510 with a computer system receiving an indication (e.g., indication 125) that a software package is to be distributed to a plurality of server systems (e.g., server systems 115) within a data storage facility (e.g., system 100). Each of the plurality of server systems may be connected to a respective network switch (e.g., TOR network switch 245) and implements a respective instance of a database system (e.g., database instance 250).

In step 520, the computer system determines a division of the plurality of server systems into two or more groups (e.g., groups 135) for distribution of the software package. In some embodiments, the division of the plurality of server systems into the two or more groups is such that, for a given group, the server systems within that group are connected to the same respective network switch and implement the same instance of a database system.

In step 530, the computer system selects, for a given one of the two or more groups, a server system within the given group as a seed server system (e.g., seed server system 137) to retrieve the software package and facilitate peer-to-peer distribution of the software package to remaining server systems within the given group. In this context, the term "peer-to-peer distribution" thus refers to a paradigm in which, within the context of a given group of computers, those systems other than the seed server system (the "remaining server systems") retrieve some or all of the software package either from the seed server system, one or more other server systems in the group that received this information from the seed server system, or a combination thereof. In other words, those server systems in the group other than the seed server system receive the software package from their "peers," and thus do not retrieve the software package from a location outside the group (e.g., some central software repository). In some embodiments, the computer system maintains information indicating applications that are executing on server systems in a given group. Accordingly, the selected server system may be selected based on a type of application (e.g., a mail application) executing on that server system.

In step 540, the computer system receives, from the seed server system, metadata (e.g., metadata file 127) that specifies one or more files included in the software package. The metadata may specify, for a given file in the one or more files included in the software package, a checksum usable to verify that given file. Accordingly, in some embodiments, the computer system receives, from one or more server systems within the given group, indications that the one or more files included in the software package has been verified.

In step 550, the computer system provides the metadata to at least one of the remaining server systems in the given group for retrieving the software package from the seed server system. In some embodiments, the computer system provides the metadata to a tracker computer system (e.g., tracker 230) that is configured to track progress of the at least one remaining server system in retrieving the software package from the seed server system.

In some embodiments, the computer system causes distribution of the software package to be staggered by network switch such that a set of the plurality of server systems that is associated with a particular network switch distributes the software package before another set of the plurality of server systems associated with a different network switch.

Figure 6:
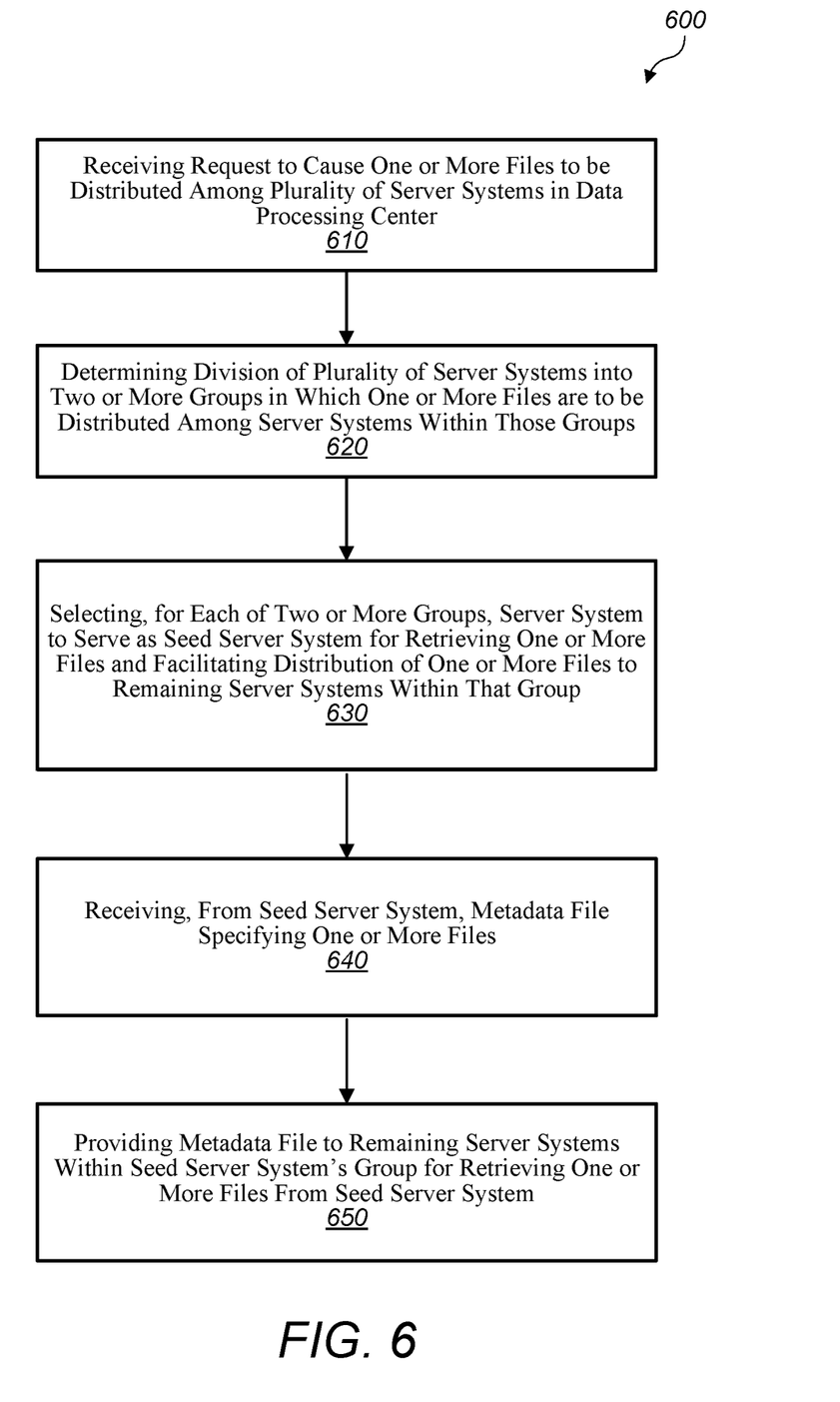

Turning now to FIG. 6, a flow diagram of a method 600 is shown. Method 600 is one embodiment of a method performed by a computer system (e.g. package distribution system 130) to facilitate distribution of a software package. Method 600 may be performed by executing program instructions that are stored on a non-transitory computer-readable medium. In some embodiments, method 600 may include additional steps such as notifying an end user that the software package has been distributed.

Method 600 begins in step 610 with a computer system receiving a request (e.g., indication 125) to cause one or more files to be distributed among a plurality of server systems (e.g., server systems 115) in a data processing center (e.g., system 100). In various embodiments, the computer system maintains data specifying a mapping of server systems to racks (e.g., racks 240) and a mapping of server systems to database instances (e.g., database instances 250).

In step 620, the computer system determines a division of the plurality of server systems into two or more groups (e.g., groups 135) in which the one or more files are to be distributed among server systems within those groups. The plurality of server systems may be divided into the two or more groups such that server systems in a given one of the two or more groups are associated with the same rack and the same database instance.

In step 630, the computer system selects, for each of the two or more groups, a server system to serve as a seed server system (e.g., seed server system 137) for retrieving the one or more files and facilitating distribution of the one or more files to the remaining server systems within that group. The computer system may pseudo-randomly select, for each group, the seed server system for that group. In various embodiments, the computer system may cause a first seed server system in a first rack to retrieve the one or more files before a second seed server system in a second rack. In such embodiments, the first and second seed server systems may correspond to a particular database instance In step 640, the computer system receives, from the seed server system, a metadata file (e.g., metadata file 127) specifying the one or more files. The metadata file may specify, for a given one of the one or more files, a checksum usable to verify a validity of that given file.

In step 650, the computer system provides the metadata file to the remaining server systems within the seed server system's group for retrieving the one or more files from the seed server system. In some embodiments, the computer system receives, from a given one of the plurality of server systems, an indication that the given server system has finished retrieving the one or more files. In response to determining that the plurality of server systems have retrieved the one or more files, the computer system may notify an issuer of the request (e.g., a user or store 120) that the request has been completed.

Figure 7:
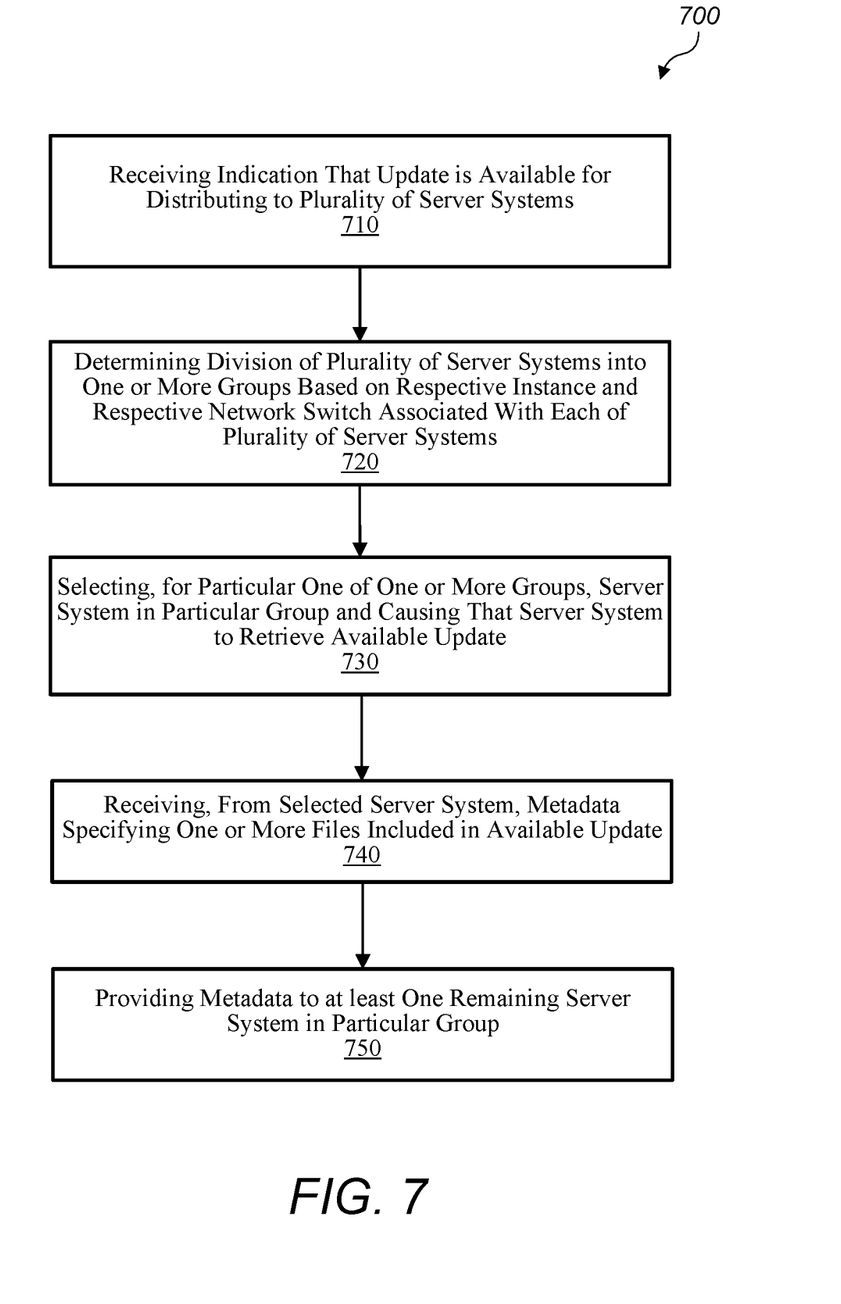

Turning now to FIG. 7, a flow diagram of a method 700 is shown. Method 700 is one embodiment of a method performed by a computer system/release server system (e.g. package distribution system 130) to facilitate distribution of a software package. In some embodiments, method 700 may include additional steps such as notifying an end user that the software package has been distributed.

Method 700 begins in step 710 with a computer system receiving an indication (e.g., indication 125) that an update is available for distributing to a plurality of server systems (e.g., server systems 115). Each of the plurality of server systems may be associated with a respective instance of a database system (e.g., database instance 250) and a respective network switch (e.g., TOR network switch 245).

In step 720, the computer system determines a division of the plurality of server systems into one or more groups (e.g., groups 135) based on the respective instance and the respective network switch associated with each of the plurality of server systems. The plurality of server systems may be divided into the one or more groups such that a given group's server systems have the same gateway Internet Protocol (IP) address.

In step 730, the computer system selects, for a particular one of the one or more groups, a server system (e.g., a server system 115 selected as a seed server system 137) in the particular group and causes that server system to retrieve the available update. In some embodiments, the server system is selected based on a type of application that that server system is running.

In step 740, the computer system receives, from the selected server system, metadata (e.g., metadata file 227) specifying one or more files included in the available update. The metadata may further specify a tracker server system (e.g., tracker 230) that coordinates peer-to-peer distribution of the available update.

In step 750, the computer system provides the metadata to at least one remaining server system in the particular group. The metadata may be usable by the at least one remaining server system to retrieve the available update from the selected server system. In some embodiments, the computer system causes the available update to be distributed to the particular group (e.g., to serve as a test group). After the available update has been distributed within the particular group, the computer system may cause the available update to be distributed to the remaining one or more groups. In some embodiments, the computer system prevents server systems in a first group (e.g., group 135A) associated with a first respective network switch from retrieving the available update from server systems in a second group (e.g., group 135B) associated with a second respective network switch.

Exemplary Computer System

Figure 8:
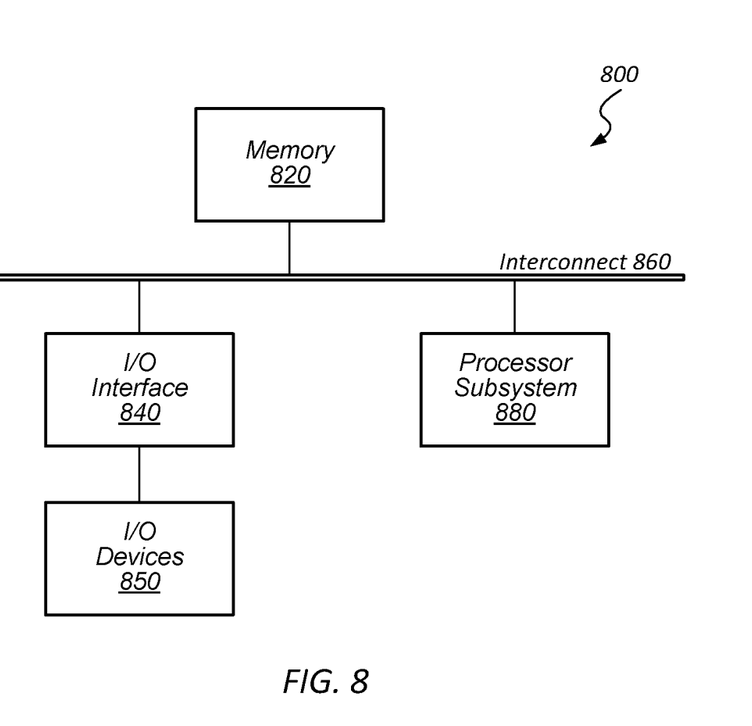
FIG. 8 is a block diagram illustrating an exemplary computer system, according to some embodiments.

Turning now to FIG. 8, a block diagram of an exemplary computer system 800, which may implement system 100, server systems 115, and distribution system 130, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, server systems 115, distribution system 130, etc. described above may include (or be included within) system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a package distribution computer system, an indication that a software package is to be distributed to a plurality of server systems that collectively implement a plurality of instances of a database system;
determining, by the package distribution computer system for those server systems that implement a particular instance of the database system, a division of those server systems into at least a first group associated with a first network switch and a second group associated with a second, different network switch; and
causing, by the package distribution computer system, distribution of the software package to be staggered by network switch such that the first group distributes the software package before the second group, wherein the causing includes:
selecting a server system within the first group as a seed server system to retrieve the software package and facilitate peer-to-peer distribution of the software package to remaining server systems within the first group;
receiving, from the seed server system, metadata that specifies one or more files included in the software package; and
providing the metadata to at least one of the remaining server systems in the first group for retrieving the software package from the seed server system.

2. The method of claim 1,
wherein the metadata specifies, for a given file in the one or more files included in the software package, a checksum usable to verify that given file; and
receiving, by the package distribution computer system from one or more server systems in the first group, indications that the one or more files included in the software package has been verified.

3. The method of claim 1, further comprising:
providing, by the package distribution computer system, the metadata to a tracker computer system configured to track progress of the at least one remaining server system in retrieving the software package from the seed server system.

4. The method of claim 1, further comprising:
maintaining, by the package distribution computer system, application information indicating applications that are executing on server systems in the first group, wherein the selecting includes analyzing, based on the application information, a type of application executing on each of at least two server systems within the first group.

5. A non-transitory computer-readable medium having program instructions stored thereon that are capable of causing a computer system to perform operations comprising:
receiving a request to cause one or more files to be distributed among a plurality of server systems in a data processing center that collectively implement a plurality of instances of a database system;
determining, for those server systems that implement a particular instance of the database system, a division of those server systems into at least a first group associated with a first network switch and a second group associated with a second, different network switch;
causing distribution of the one or more files to be staggered by network switch such that the first group distributes the one or more files before the second group, wherein the causing includes:
selecting, for the first group, a server system to serve as a seed server system for retrieving the one or more files and facilitating distribution of the one or more files to the remaining server systems within the first group;

receiving, from the seed server system, a metadata file specifying the one or more files; and providing the metadata file to the remaining server systems within the first group for retrieving the one or more files from the seed server system.

6. The non-transitory computer-readable medium of claim 5, wherein the operations further comprise:

maintaining data specifying a mapping of server systems to racks and a mapping of server systems to database instances; and wherein the division is such that, for the first group, the server systems within that group are associated with the same rack.

7. The non-transitory computer-readable medium of claim 5, wherein the operations further comprise:

receiving, from a given one of the plurality of server systems, an indication that the given server system has finished retrieving the one or more files.

8. The non-transitory computer-readable medium of claim 7, wherein the operations further comprise:

responsive to determining that the plurality of server systems have retrieved the one or more files, notifying an issuer of the request that the request has been completed.

9. The non-transitory computer-readable medium of claim 5, wherein the metadata file specifies, for a given one of the one or more files, a checksum usable to verify a validity of that given file.

10. A method, comprising:

receiving, by a release server system, an indication that an update is available for distributing to a plurality of server systems, wherein each of the plurality of server systems is associated with a respective instance of a database system and a respective network switch;

determining, by the release server system, a division of the plurality of server systems such that server systems that implement the same respective instance are distributed across at least two different groups, wherein server systems within a first group of the at least two different groups are associated with a first network switch and server systems within a second group of the at least two different groups are associated with a second, different network switch;

staggering, by the release server system, distribution of the update by network switch such that the first group distributes the update before the second group, wherein causing the first group to distribute the update includes:

selecting a server system in the first group and causing that server system to retrieve the available update, wherein the selecting includes analyzing a set of properties of at least two server systems within the first group;

receiving, from the selected server system, metadata specifying one or more files included in the available update; and providing, the metadata to at least one remaining server system in the first group, wherein the metadata is usable by the at least one remaining server system to retrieve the available update from the selected server system.

11. The method of claim 10, wherein server systems of the first group have the same gateway Internet Protocol (IP) address.

12. The method of claim 10, wherein the metadata specifies a tracker server system that coordinates peer-to-peer distribution of the available update.

13. The method of claim 10, further comprising:

preventing, by the release server system, server systems in the first group from retrieving the available update from server systems in the second group.

14. The method of claim 10, wherein the analyzing is based on a type of application that is running on each of the at least two server systems.

* * * * *